United States Patent
Yun et al.

(10) Patent No.: US 9,237,150 B2
(45) Date of Patent: Jan. 12, 2016

(54) METHOD AND SYSTEM FOR PROTECTING A PASSWORD DURING AN AUTHENTICATION PROCESS

(71) Applicant: C3S PTE. LTD., Singapore (SG)

(72) Inventors: Ta Chun Yun, Singapore (SG); Viet Thang Nguyen, Singapore (SG)

(73) Assignee: C3S PTE. LTD., Singapore (SG)

( * ) Notice: Subject to any disclaimer, the term of this patent is extended or adjusted under 35 U.S.C. 154(b) by 0 days.

(21) Appl. No.: 14/398,710

(22) PCT Filed: May 3, 2013

(86) PCT No.: PCT/SG2013/000174
§ 371 (c)(1),
(2) Date: Nov. 3, 2014

(87) PCT Pub. No.: WO2013/165317
PCT Pub. Date: Nov. 7, 2013

(65) Prior Publication Data
US 2015/0121467 A1 Apr. 30, 2015

(30) Foreign Application Priority Data

May 3, 2012 (SG) ................................ 201203269-4

(51) Int. Cl.
*H04L 29/06* (2006.01)
*G06F 21/46* (2013.01)
(Continued)

(52) U.S. Cl.
CPC .............. *H04L 63/083* (2013.01); *G06F 21/31* (2013.01); *G06F 21/40* (2013.01); *G06F 21/46* (2013.01); *H04L 9/0863* (2013.01); *H04L 63/10* (2013.01); *G06F 2221/2107* (2013.01)

(58) Field of Classification Search
CPC . G06F 21/46; G06F 2221/2107; G06F 21/31; G06F 21/40; H04L 63/10; H04L 9/0863; H04L 63/083

USPC .......................................................... 726/4–6
See application file for complete search history.

(56) References Cited

U.S. PATENT DOCUMENTS 6,792,536 B1 * 9/2004 Teppler .................. G06F 21/64
713/178
2006/0249574 A1 * 11/2006 Brown ............. G06K 19/06187
235/380

(Continued)

FOREIGN PATENT DOCUMENTS

KR    1020090061154 A    6/2009
WO       2004057516 A1    7/2004

OTHER PUBLICATIONS

International Preliminary Report on Patentability for International Application No. PCT/SG2013/000174, International Filing Date May 3, 2013, Report Issued Nov. 4, 2014, 7 pages.

(Continued)

*Primary Examiner* — Haresh N Patel
(74) *Attorney, Agent, or Firm* — KPPB LLP

(57) ABSTRACT

A system for providing security for a personal password during an authentication process. The system combines the use of representative characters to disguise the characters of the password and the use of a separate verification code sent to the user for use in the authentication process. A server generates and sends both a set of representative characters and a verification code to a client device. The user then inputs a mixed string having the password and verification code interspersed in order using the representative characters in place of the characters of the password and verification code. The server then receives the input and determines whether the string of representative characters includes the password and verification code characters in the proper order.

30 Claims, 12 Drawing Sheets

(51) Int. Cl.
*G06F 21/31* (2013.01)
*G06F 21/40* (2013.01)
*H04L 9/08* (2006.01)

(56) References Cited

U.S. PATENT DOCUMENTS

| | | | |
|---|---|---|---|
| 2007/0136211 A1* | 6/2007 | Brown | G07F 7/1083 |
| | | | 705/75 |
| 2007/0208671 A1* | 9/2007 | Brown | G06Q 20/341 |
| | | | 705/65 |
| 2007/0226784 A1* | 9/2007 | Ueda | G06F 21/36 |
| | | | 726/5 |
| 2007/0234063 A1* | 10/2007 | Ueda | G11C 7/24 |
| | | | 713/183 |
| 2008/0169351 A1* | 7/2008 | Whiting | G06K 19/06187 |
| | | | 235/493 |
| 2009/0006262 A1* | 1/2009 | Brown | G06Q 20/12 |
| | | | 705/64 |
| 2009/0037988 A1 | 2/2009 | Yang et al. | |
| 2010/0187303 A1 | 7/2010 | Eckert et al. | |
| 2010/0275010 A1* | 10/2010 | Ghirardi | G06F 21/35 |
| | | | 713/155 |
| 2010/0275257 A1 | 10/2010 | Nishida | |
| 2010/0318807 A1 | 12/2010 | Wang | |
| 2011/0055593 A1* | 3/2011 | Lurey | G06F 21/31 |
| | | | 713/193 |
| 2011/0088085 A1 | 4/2011 | Novak | |
| 2011/0145150 A1* | 6/2011 | Onischuk | G06Q 30/08 |
| | | | 705/50 |
| 2011/0202981 A1* | 8/2011 | Tamai | G06F 21/10 |
| | | | 726/6 |
| 2011/0228919 A1* | 9/2011 | Tew | H04M 3/38 |
| | | | 379/93.12 |
| 2012/0310720 A1* | 12/2012 | Balsan | G06Q 20/204 |
| | | | 705/14.26 |
| 2013/0166913 A1* | 6/2013 | Lenon | H04L 9/3226 |
| | | | 713/170 |
| 2013/0185778 A1* | 7/2013 | Tamai | G06F 21/36 |
| | | | 726/6 |
| 2013/0185779 A1* | 7/2013 | Tamai | G06F 21/36 |
| | | | 726/6 |

OTHER PUBLICATIONS

International Search Report and Written Opinion for International Application No. PCT/SG2013/000174, International Filing Date May 3, 2013, Report Completed Aug. 22, 2013, Mailed Aug. 23, 2013, 9 pages.

Singapore Search Report for Application No. 201203269-4, Filing Date May 3, 2012, Report Completed Feb. 23, 2013, Mailed Mar. 5, 2013, 8 pages.

* cited by examiner

METHOD AND SYSTEM FOR PROTECTING A PASSWORD DURING AN AUTHENTICATION PROCESS

FIELD OF THE INVENTION

This invention relates to a system for protecting a user password. More particularly, this invention relates to a system and method to receive an input string that combines a user password and a system generated verification code and the use of representative characters to replace the actual characters of the password and verification code in the input string to protect the password from snooping type attacks.

SUMMARY OF THE PRIOR ART

Passwords are one of the most common means to authenticate a user and grant access to a system. Hence, it is common for attackers to target passwords to get access to a system. With the increased use of interactive communications, those skilled in the art are constantly striving to thwart the theft of passwords by hackers. However, it is a constant struggle to prevent the theft of passwords as hackers have become more aggressive and savvy.

The most basic type of attack adopted by hackers is a brute-force search. A brute-force search is a simple trial-and-error process that tries out all possible combinations of input. A brute-force search may be enhanced by the inclusion of a dictionary of common passwords and password patterns that may be attempted first in order to speed up the search. One of the best methods to counter brute-force attack is to increase the length and randomness of the user's password. However, increasing the length and randomness of passwords are impractical since most users find that it is very difficult to remember a random and lengthy password.

While random and lengthy passwords are a good defense against brute-force attack, random and lengthy passwords are unable to prevent against other types of attacks such as key-logging, screen capturing, and relay attacks. In these types of attacks, a hacker uses tools to eavesdrop on the user communications with a system, records the password, and later uses the password to gain access to the system.

To counter this type of attack, one common defense is a two-factor authentication (2FA) system. A 2FA system provides a one-time password, via a separate channel, for the user to use during log-in, in addition to the traditional password that the user keeps. With the 2FA system, attackers cannot login to system even if they are able to capture the user's full password.

However, 2FA systems have limitations. One limitation is that a one-time password has to be delivered either via a hardware device such as token, card, printed paper; or via a short messaging service (SMS) sent to a mobile telephone of the user. For hardware devices, it is costly for a system owner as a separate device is required for each independent system (for example, for each credit card). It is common for a user to have 5-6 accounts. Thus, the user must have 5-6 separate devices in order to gain access to the accounts. Furthermore, if a device is lost, the user cannot access the account serviced by the device until a new device has been issued and received.

Some limitations of using SMS messages include the fact that SMS messages are costly for users and are not always available. For example, if a user is abroad, a substantial roaming charge may be charged for each SMS message received or mobile telephone service may not be available. Hence, the user may not be able to access the systems.

For the above reasons, those skilled in the art are constantly striving to provide better means for securing a password while allowing easy access to a system.

SUMMARY OF THE INVENTION

The above and other problems are solved and an advance in the art is made by systems and methods provided by embodiments in accordance with the invention. A first advantage of a system and method embodying this invention is that the use of a verification code prevents an attacker from accessing the system if a password is determined through an attack. A second advantage of a system and method embodying this invention is that the user password is better protected from brute-force and key-capturing/tracking attacks. A third advantage is that the password is protected from discovery through the use of representative characters and the combination of the password, verification code, and possibly random characters in the input string. A fourth advantage is that a password does not have to be lengthy or random to prevent detection; and may be chosen by the user. A fifth advantage is that the system is always available regardless of the location of the user. A sixth advantage is that a user does not need a second device to obtain log-in information.

The above advantages are provided by embodiments of a system in accordance with the invention that operate in the following manner. In response to receiving a request to access the system from the user, the system receives a password associated with the user that is stored by the system. The password is a string of P numbers of base characters. The system then generates R representative characters. Each of the R representative characters represents a representation code of a predetermined number, K, of base characters. Further, each of the base characters is represented by at least one of the R representative characters generated by the system and at least one of the base characters is represented by more than one of the R representative characters. In accordance with some embodiments, the number, R, of representative characters is less than the number of base characters. In accordance with still other embodiments, the number, R, of representative characters is much less than number of base characters. The system also generates a verification code. The verification code may be a string of base characters.

The system then transmits the R representative characters and verification code to a user device requesting access. The user then inputs a string into the user device. The system then receives the input string from the user device. The input string is a string composed of R representative characters and includes the representative characters that represent the characters of the password and verification codes, interspersed in order throughout the string. In response to receiving the input string, the system determines whether the representative characters in the string represent the base characters of the password and the verification code in the proper order. If the system determines that the representative characters of the string include the password and verification code in the proper order, the system authenticates the user. The system may also prohibit access in response to a determination that the input string does not include representative characters that represent the password and verification code in the proper order. In accordance with some embodiments of this invention, the input string may also include random characters that are interspersed with the password and verification code.

In some embodiments in accordance with this invention, the system stores the R representative characters and the representation code of each of the R representative characters responsive to generating the R representative characters. Further, the system stores the verification code for use in authentication of the input.

In some embodiments in accordance with this invention, the system generates the R representative characters in the following manner. The system begins by generating a seed list of base characters that is R*K in length. R is the number of representative characters being generated and K is the number of base characters represented by each representative character. In these embodiments, the seed list includes at least one occurrence of each of the base characters. The systems then inserts each of the base characters in the seed list into a representative code list of one of the R representative characters. In accordance with some of these embodiments, the system generates the seed list by randomly selecting one of the base characters for each position in said seed list. The system then determines whether the generated seed list includes at least one occurrence of each of the base characters. If the generated seed list does not include each of the base characters, the system generates a new seed list in the same manner.

In accordance with some of these embodiments, the insertion of the base characters in the representative code lists of the R representative characters is performed in the following manner. The system begins by selecting a base character from the seed list. The system then selects one of the code lists of an available R representative character. The system then inserts the selected base character in the representative code list of the selected representative character. The system then determines whether the representative code list of the selected representative character is complete. If the representative code list is complete, the selected representative character is removed from the available representative characters. The selected base character is also removed from the seed list. The system repeats this process until all of the base characters in the list are assigned. Preferably, the base character is randomly selected from the seed list and the representative character is randomly selected from the available R representative characters.

In some embodiments in accordance with this invention, the system generates the verification code in the following manner. The system begins by randomly selecting a base character. The selected base character is then appended to a verification code string. The system then determines if the verification code string is a desired length. If not, the process is repeated until the desired length is reached.

In some embodiments in accordance with this invention, the system determines whether the representative characters in the input string represent the base characters of the password and the verification code in a proper order in the following manner. The system compares the base characters in the representative code list of each of the R representative characters in the input in order to the base characters in both the password and the verification code.

In accordance with some of these embodiments, the comparison is performed in the following manner. The system begins by setting a current character of the input to a first character of the input, setting a current character of the password to the first character of the password, and setting a current character of the verification code to the first character of the verification code. The system then compares the current character of the password to each base character represented by the representative character in the current position in the input. If the one of the base characters represented by the representative character matches the character of the current position of the password, the system determines whether the current character of the password is the last character of the password. If the current character is the last character of the password, the system determines a match for a password. If the current character is not the last character, the system then sets the current character of the password to the next character. The system then determines if the current character of the input is the last character. If not, the current character of the input is set the next character and the system repeats the process of comparing. If the current character is the last character of the input, the system determines there is no match.

If the current characters of the password and input do not match, the system compares the current character of the input to the current input to the current character of the verification code. If one of the base characters represented by the representative character matches the character of the current position of the verification code, the system determines whether the current character of the verification code is the last character of the verification code. If the current character is the last character of the verification code, the system determines a match for a verification code. The system then determines whether both the verification code and password are matched. If so, the user is authenticated.

If the current character is not the last character of the verification code, the system then sets the current character of the verification code to the next character. The system then determines if the current character of the input is the last character. If not, the current character of the input is set to the next character and the system repeats the process of comparing. If the current character is the last character of the input, the system determines no match.

In some embodiments in accordance with the invention, the R representative characters are the numerals 0-9. In some embodiments in accordance with this invention, the base characters are the alphanumeric characters. In other embodiments, the base characters are a set of ANSI characters.

In some embodiments in accordance with this invention, the verification code is transmitted to the user in a sms message to a telephone number associated with the user. In other embodiments in accordance with this invention, the verification code is transmitted to the user in an e-mail.

In some embodiments in accordance with this invention, the client device performs the following process. The process begins by receiving information about the R representative characters and the representation code lists of each of the R representative characters. A display of the R representative characters and the representation code of each of R representative characters are generated. In some of these embodiments, the display includes a table of N columns and M rows of representative characters where N*M=R. The generated display is then displayed to the user. An input string of representative characters is then received from the user. The input string is then transmitted to a server providing the system.

In some embodiments in accordance with this invention, the input string is encrypted by the client device prior to transmission and the system decrypts the input string upon receipt.

BRIEF DESCRIPTION OF THE DRAWINGS

The above advantages and features in accordance with this invention are described in the following detailed description and are shown in the following drawings.

DETAILED DESCRIPTION

This invention relates to a system for protecting a user password. More particularly, this invention relates to a system and method for receiving an input string that combines a user password and a system generated verification code and uses representative characters to replace the actual characters of the password and verification code in the input string to protect the password from snooping type attacks.

In accordance with this invention, a system provided by a service provider authenticates a user with a password. The password is a string of characters that a user inputs to gain access to the services of the provider. The password is either selected by the user or assigned by the provider when a user is registered with the provider. The characters that may be used to generate a password are base characters. In accordance with some embodiments, the base characters may be alphabet characters, alphanumeric characters, or any other set of ANSI characters that the provider allows. The invention relates to a system that obfuscates the password to prevent detection of the password by somehow capturing the input of user.

Figure 1:
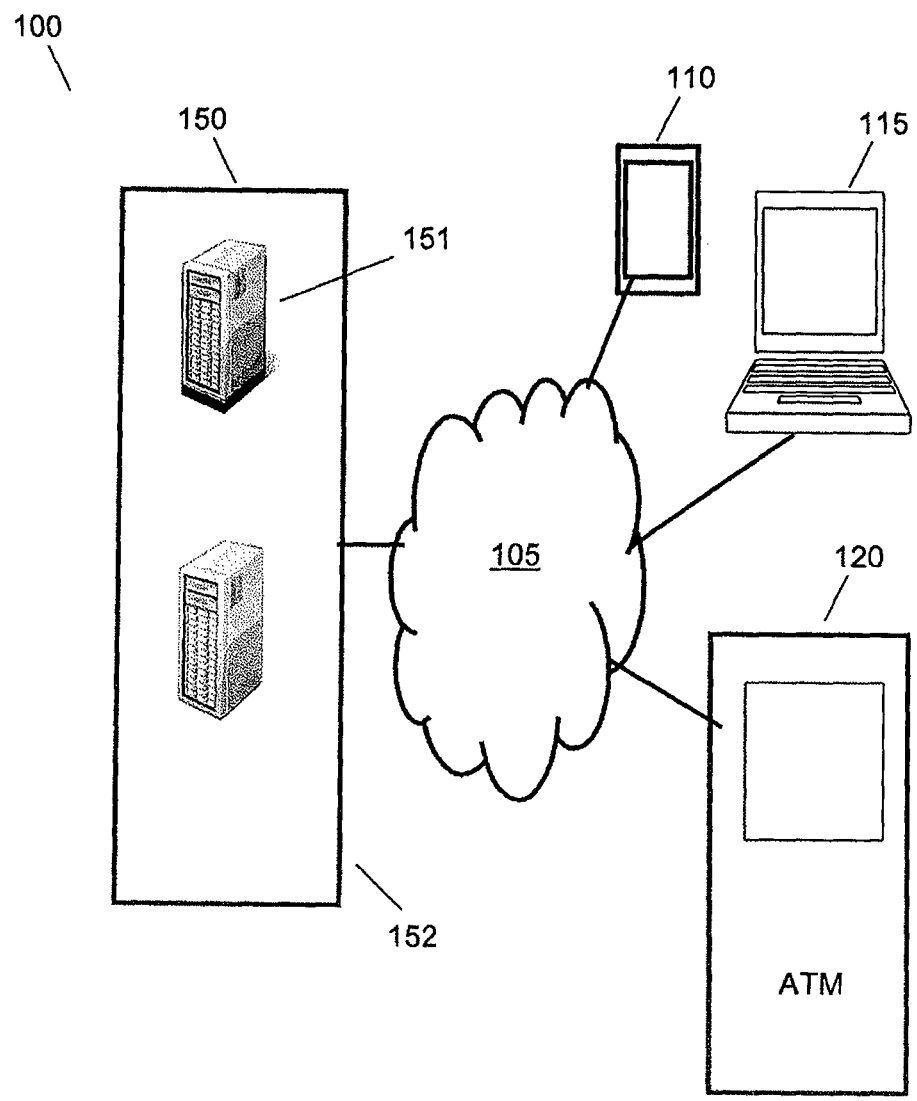
FIG. 1 illustrating devices connected by a network providing a system in embodiments in accordance with this invention.

FIG. 1 illustrates network 100 that includes the devices that execute processes to provide an authentication system in accordance with this invention. Network 100 includes provider system 150 and client devices 110, 115, and 120. Communication network 100 is a network such as the Internet that allows processing systems to communicate with one another. Provider system 150 is server 151 or a group of servers 151-152 that store data and execute processes that provide content and services to users over network 105. Device 115 is a traditional laptop or desktop computer system that is connected to network 105 via either a wire or wireless connection and accesses the content of the provider via a web browser application performed by device 115. Device 110 is a mobile device such as a Smartphone or Personal Digital Assistant (PDA) that is connected to network 105 via a wireless connection and performs a web browser or other specific application to access the content provided by the provider. Device 120 is a kiosk, such as an Automated Teller Machine (ATM) having a processing system that is connected to network 105 via a wired or wireless connection and accesses the provider content via a web browser or other application. One skilled in the art will recognize that devices 110, 115, and 120 are only provided as examples and other types of user devices may be used to access the content of the provider without departing from this invention.

Figure 2:
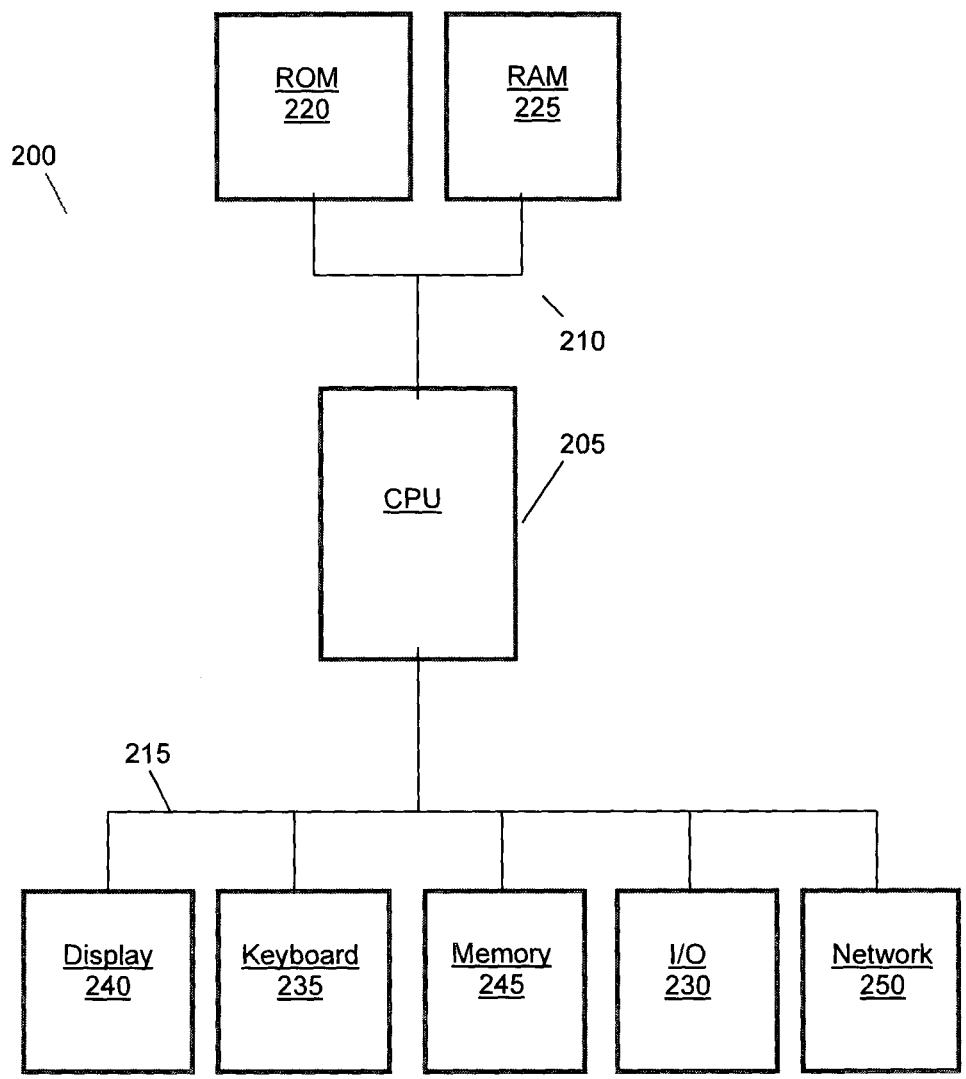
FIG. 2 illustrating a block diagram representative of processing systems providing embodiments in accordance with this invention.

Processes provided by instructions stored by a media are executed by a processing system in a user's computer system and in one or more servers to provide this invention. The instructions may be stored as firmware, hardware, or software. FIG. 2 illustrates processing system 200. Processing system 200 may be the processing system in the user's computer system and servers that execute the instructions to perform the processes for providing a method and/or system in accordance with this invention. One skilled in the art will, recognize that the exact configuration of each processing system may be different and the exact configuration of the processing system in each device may vary and FIG. 2 is given by way of example only.

Processing system 200 includes Central Processing Unit (CPU) 205. CPU 205 is a processor, microprocessor, or any combination of processors and microprocessors that execute instructions to perform the processes in accordance with the present invention. CPU 205 connects to memory bus 210 and Input/Output (I/O) bus 215. Memory bus 210 connects CPU 205 to memories 220 and 225 to transmit data and instructions between the memories and CPU 205. I/O bus 215 connects CPU 205 to peripheral devices to transmit data between CPU 205 and the peripheral devices. One skilled in the art will recognize that I/O bus 215 and memory bus 210 may be combined into one bus or subdivided into many other busses and the exact configuration is left to those skilled in the art.

A non-volatile memory 220, such as a Read Only Memory (ROM), is connected to memory bus 210. Non-volatile memory 220 stores instructions and data needed to operate various sub-systems of processing system 200 and to boot the system at start-up. One skilled in the art will recognize that any number of types of memory may be used to perform this function.

A volatile memory 225, such as Random Access Memory (RAM), is also connected to memory bus 210. Volatile memory 225 stores the instructions and data needed by CPU 205 to perform software instructions for processes such as the processes required for providing a system in accordance with this invention. One skilled in the art will recognize that any number of types of memory may be used as volatile memory and the exact type used is left as a design choice to those skilled in the art.

I/O device 230, keyboard 235, display 240, memory 245, network device 250 and any number of other peripheral devices connect to I/O bus 215 to exchange data with CPU 205 for use in applications being executed by CPU 205. I/O device 230 is any device that transmits and/or receives data from CPU 205. Keyboard 235 is a specific type of I/O that receives user input and transmits the input to CPU 205. Display 240 receives display data from CPU 205 and display images on a screen for a user to see. Memory 245 is a device that transmits and receives data to and from CPU 205 for storing data to a media. Network device 250 connects CPU 205 to a network for transmission of data to and from other processing systems, Embodiments of the present invention combine two types of prevention mechanisms to prevent detection of a user password from the act of capturing the password as the user inputs the password. The first is the use of representative characters. Representative characters may also be termed an N-pad. Representative characters are a set of characters that each represents multiple base characters. In most systems, the set of representative characters includes a specific number, R, of representative characters. Each of the R representative characters represents a certain number, K, of base characters. R may be any number. However, R is typically much less than the total number of base characters. In accordance with these embodiments, R is typically in a range between 0.25 of the number of base characters and 0.5 the number of base characters. Further one skilled in the art will note that K is typically greater than one such that each representative character maps to more than one base character. The set of base characters represented by a representative number is termed a representation code for purposes of this discussion. The mapping of representative characters to base characters makes determination of the actual password difficult if the input of a string of representative characters is captured. In addition to the more than one mapping of representative characters to base characters, two or more representative characters may resolve to the same base character. This makes it difficult for the exact encoded passwords to be determined by a potential hacker as different patterns may be used each time.

The most common use of representative characters is the use of numbers on a number pad of a telephone to represent alphabetical numbers. The set of representative characters used in accordance with embodiments with this invention are different from the telephone example in two respects. The first difference is that the set of base characters that each representative character represents is newly generated for each log-in. Thus, the sets of base characters represented are not static and change every time. For example, the number "1" may represent d, g, t, v, and s for a first use and for a subsequent use number "1" may represent a, w, n, j and f. The second difference is that each base character may be represented by more than one representative character. For example, the number "1" may represent a, g, k, x, and y in a set of representative numbers and the number "9" may represent b, h, k, s, and z in the same set. As can be seen in this example the base character k is represented by both 1 and 9. As such, a user may enter either 1 or 9 to represent the letter k when inputting a password.

Figure 3:
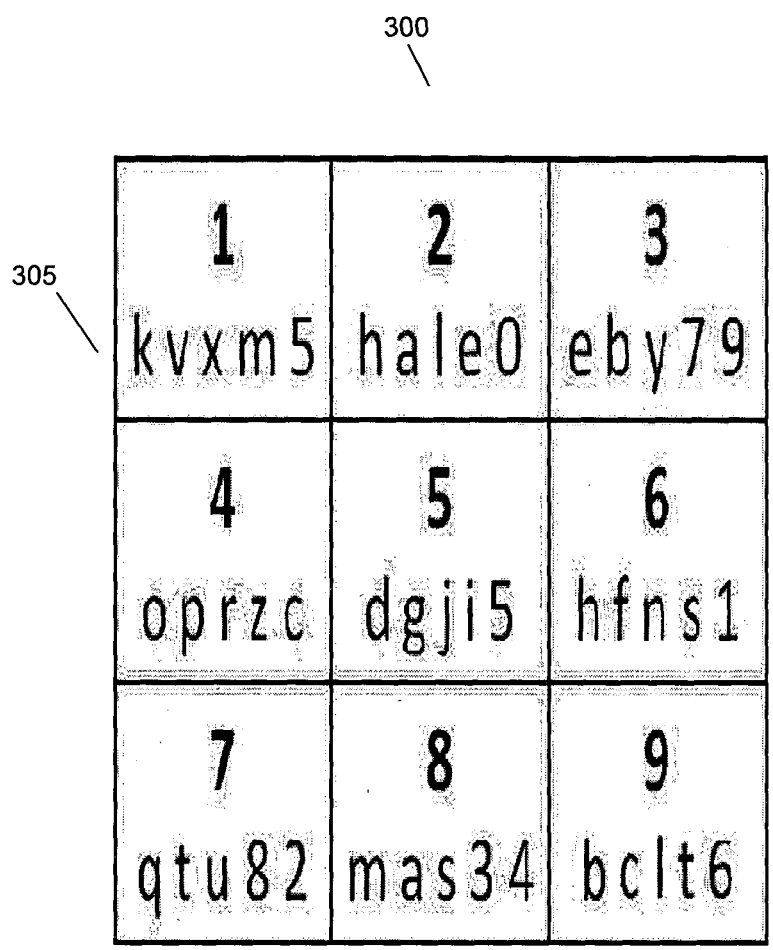
FIG. 3 illustrating a display of representative characters in accordance with embodiments of this invention.

FIG. 3 illustrates display 300 that displays a set of representative characters generated for use in inputting a password and verification in accordance with an embodiment of this invention. Display 300 shows a set of representative characters 305 that comprise numbers 1-9 that are shown in a table having 3 rows and 3 columns. One skilled in the art will recognize that any set of characters may be used as representative characters without departing from this invention. Furthermore, one skilled in art will recognize that the set of representative numbers may be displayed in any manner including tables having any N number of columns and M number of rows.

Figure 4:
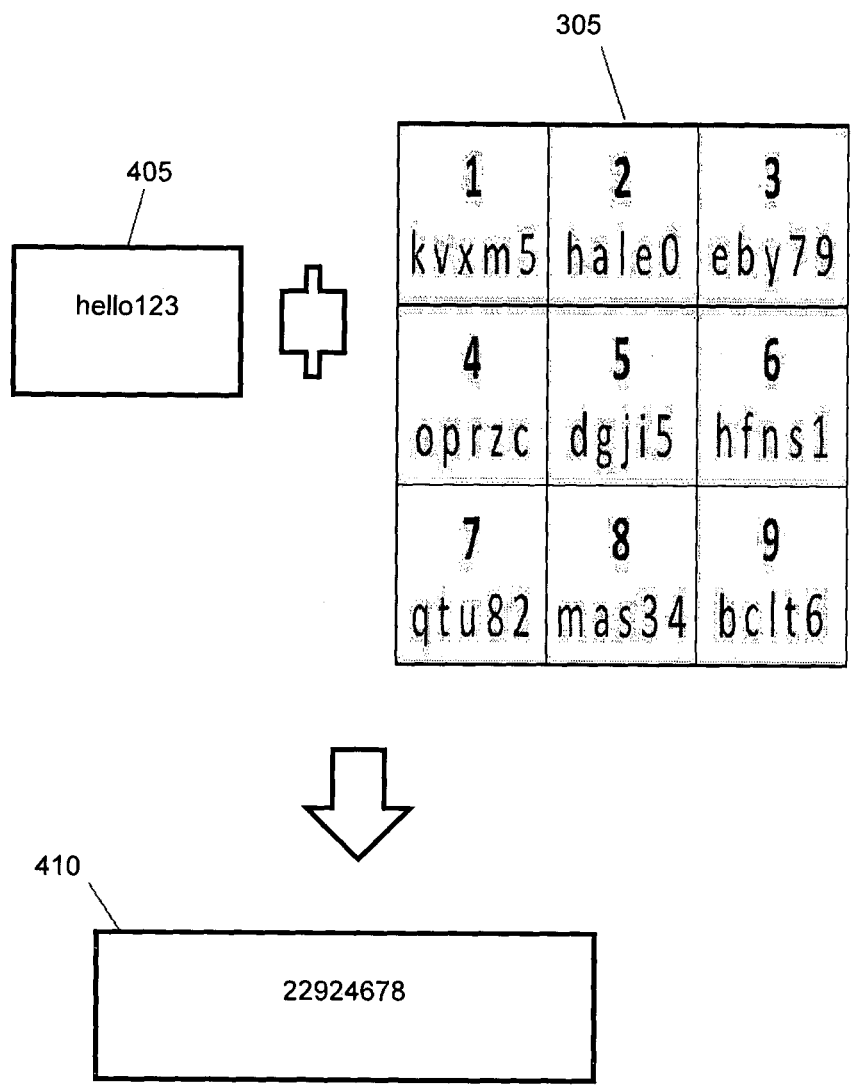
FIG. 4 illustrating application of representative characters to a password in accordance with embodiments of this invention.

FIG. 4 illustrates an example of applying a set of representative characters 305 to password 405 to generate input string 410. As shown in FIG. 4, password 405 is "hello123". Referring to set of representative characters 305, either "2" or "6" may be used to represent "h". In input 410, "2" is input to represent "h". The "e" in password 405 may be represented by "2" or "3". In input 410, "2" is input to represent "e". The same process is used to input the rest of the characters of input 410 to produce the input "22924678".

Figure 5:
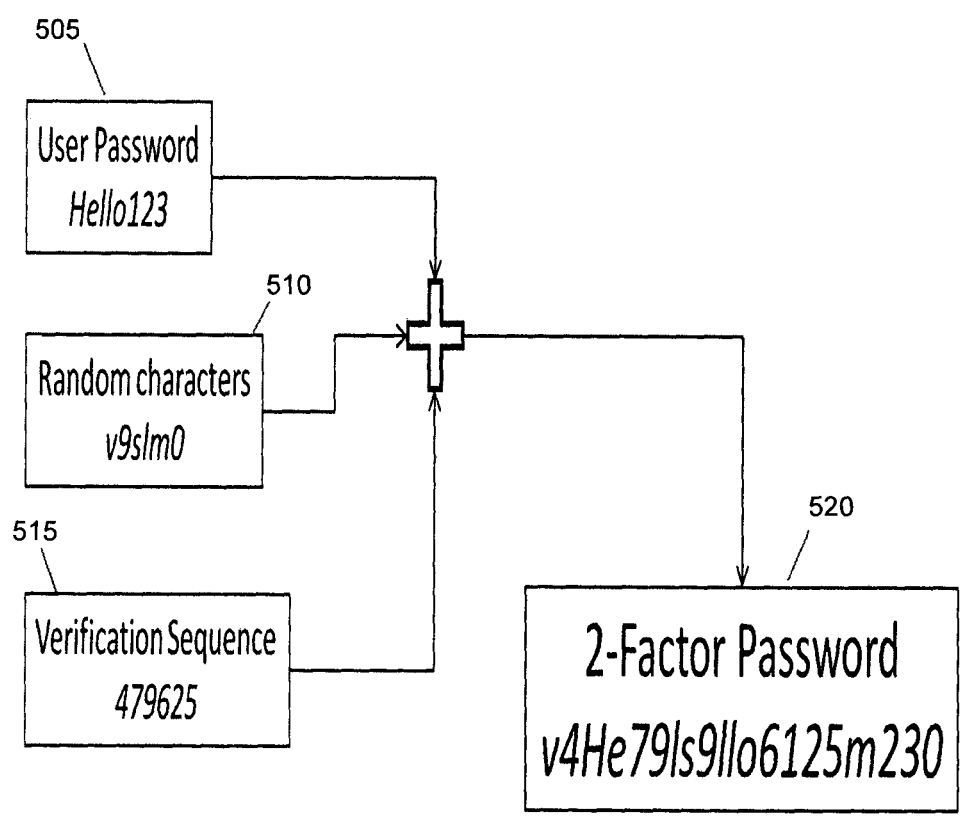
FIGS. 5 and 6 illustrating application of representative characters to a password and verification code in embodiments in accordance with this invention.

FIG. 5 illustrates the use of representative character with the second prevention mechanism of a verification code. A verification code is a string of base characters generated by the server system and transmitted to the user for use in inputting a password. In accordance with embodiments of this invention, the verification code and password are included in the input string. In addition, as shown in FIG. 5, the input may include random characters inserted by the user. The characters of the password, verification code, and random character may be interspersed. All that is required is that the characters of the password and verification code appear in that same order as given. As illustrated in FIG. 5, user password 505 is "hello123", random characters 510 include "v9 slm0", and verification code 515 is "479625". Password 505, random characters 510, and verification code 515 are mixed to form resulting string 520 which is "v4he79ls9llo625m230". Although each of the components is interspersed, the order of each component remains the same. One skilled in the art will recognize that the user is free to make any number of different combinations as long as the order of characters in the password and verification code is maintained.

Figure 6:
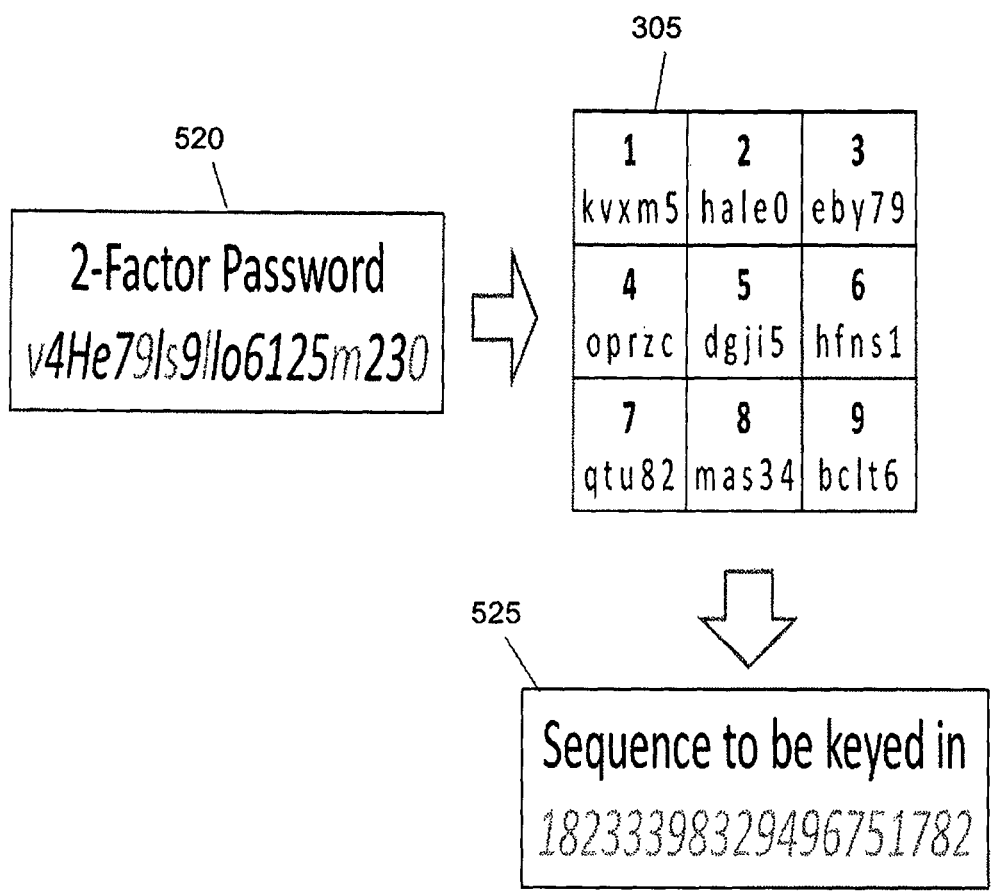

The representative characters may then be used to input this string as shown in FIG. 6. As shown in FIG. 6, set of representative characters 305 are used to enter resulting string 520 to generate input string 525. For example, the first character of resulting string 520 is "v". Representative character "1" is the only representative character having a representation code that includes "v". Thus, "1" is inserted for "v". The same process is used as described above to input all of the characters of resulting string 525 to form input string 520 having the following string of representative characters "18233398329496751782".

In order to provide such a system, an authentication process is needed that can compare the permutations of each representative character to the base characters of the password and verification code as well as maintaining the order of each of the password and verification code when the characters of the components are interspersed. The following description and FIGS. 7-12 describe embodiments of processes that provide such an authentication process in accordance with this invention.

Figure 7:
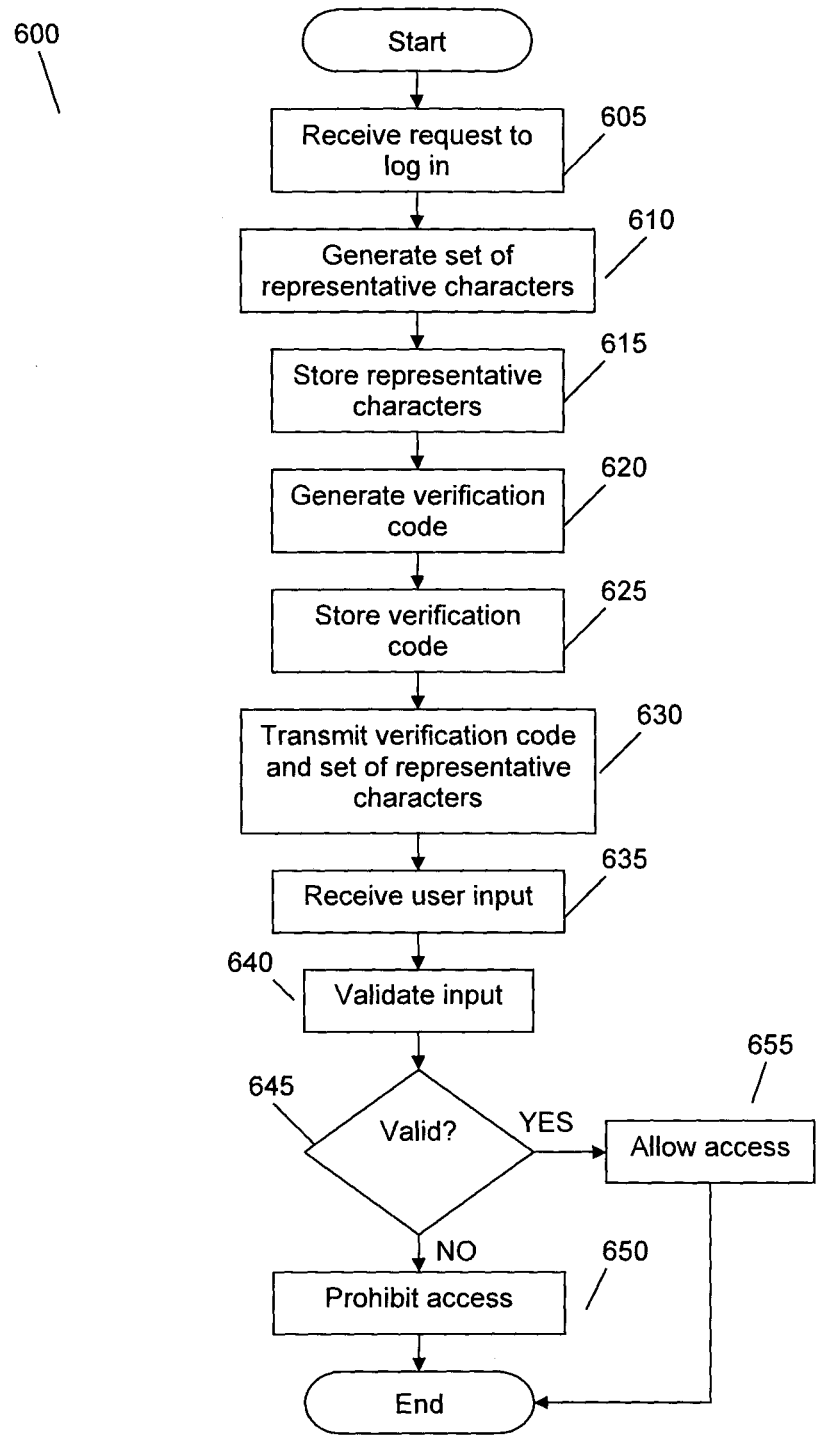
FIG. 7 illustrating a flow diagram of a process for authenticating a user in embodiments in accordance with this invention.

FIG. 7 illustrates process 600 that is performed by a service in a provider system to authenticate a user in an embodiment in accordance with this invention. Process 600 begins in step 605 by receiving a request from a user device to log-in the receiver system. One skilled in the art will recognize that the request may be requesting a web-page, an input of a pointer device in a particular area of a display of a web-page, or any other method for requesting access in the system. In response to receiving the log-in request, the system receives a user password received from the system. The password may be received by being read from a memory, by a transmission from another server, or in any other manner without departing from the invention.

Process 600 then generates a set of R representative characters as described above with reference to FIG. 3 in step 610. The process for generating a set of representative characters and a representation code for each character is described below with reference to FIG. 9. The set of representative characters and associated character codes are then stored for future use in step 615.

Process 600 then generates a verification code in step 620. The verification code is a verification code as described above with reference to FIG. 5. The verification is preferably generated from the same base characters used to generate the user password. A process for generating a verification code is described below with reference to FIG. 10. The generated verification code is then stored by the system in step 625 for use in the authentication process.

In step 630, information regarding the set of R representative characters and the associated representation codes; and the verification code are transmitted to the user device. The set of R representative characters, the associated representation codes and verification code are preferably transmitted via the same means of transmission at the same time. For example, the set of R representative characters, associated representation codes and verification code may be transmitted as part of the data for a display such as a web-page or 'pop-up' or may be transmitted as part of other information that will be used to generate the display. Alternatively, the set of R representative characters and the associated representation codes and the verification code may be sent by a separate means. For example, the set R representative characters and the associated representation codes may be set as part of the data for a display while the verification code may be transmitted by another means such as a sms message to a telephone number associated with the user or an e-mail to an e-mail address associated with the user. However, the transmission by separate means is not as preferable as it suffers the same limitations as conventional 2FA systems.

Process 600 then waits to receive an input string from the client device in step 635. In step 640, process 600 determines whether the input string is valid. The validation is performed by determining whether the representative characters in the input string include representations of the password and verification code in the proper order. A process for performing the validation is described below with reference to FIGS. 11 and 12. In step 645, the determination of whether input is valid is returned. If the input is valid, authentication is confirmed and access to the desired services is allowed in step 650. If the input is not valid, access to the user is denied in step 655. One skilled in the art will recognize that steps 650 and 655 are performed in a conventional manner and the exact details of these steps are omitted for brevity. After step 650 or 655, process ends.

Figure 8:
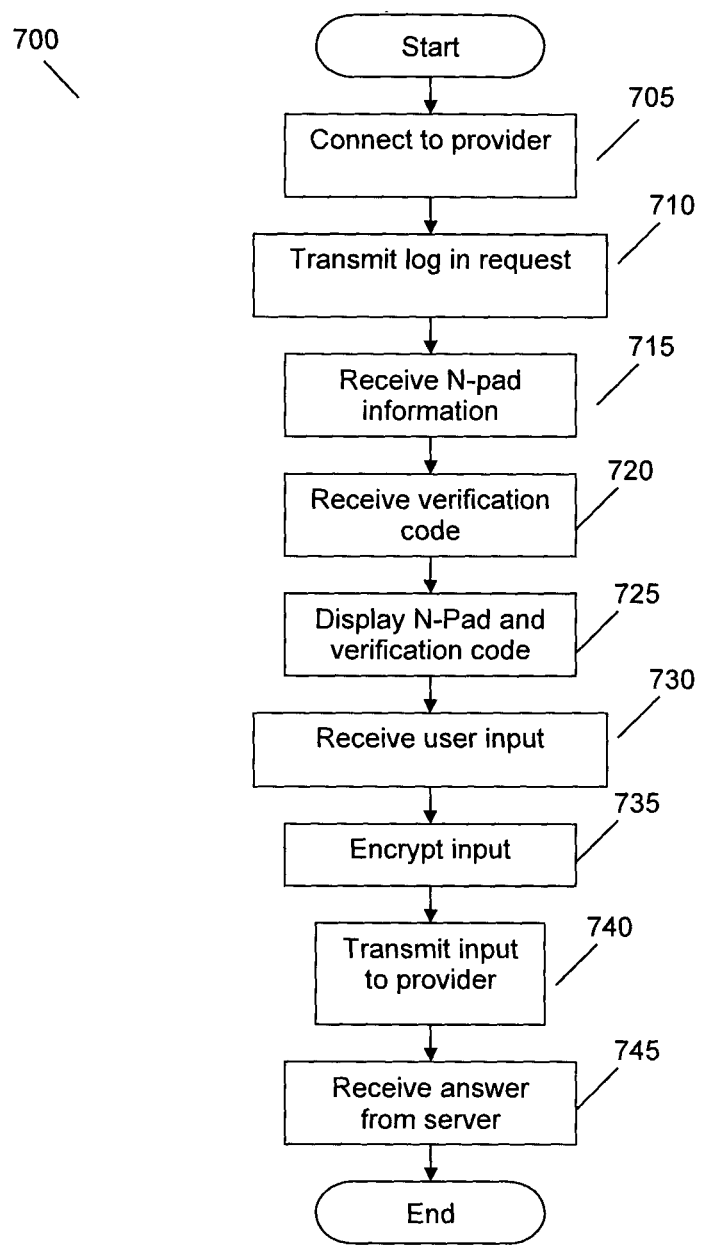
FIG. 8 illustrating a flow diagram of a process performed by a client device in embodiments in accordance with this invention.

FIG. 8 illustrates a flow diagram of process 700 that is an embodiment of a process performed by a client device in accordance with embodiments of this invention. Process 700 begins in step 705 by connecting to the provider system. This may be performed by the client device accessing a web-page of the provider or in any other manner. In step 710, the client device requests to perform a log-in for the provider system. One skilled in the art will recognize this may be an automatic process when accessing the web-page, may be a specific request indicated by an input to a certain area of the display or any other manner of requesting access.

Process 700 then receives information about the set of representative characters in step 715. Optionally, the verification code is received by the client device in step 720. Otherwise, the verification code may be received in another manner as described above. In step 725, a display including the set of representative characters and optionally the verification code is generated and displayed to the user. The display may be a web-page and/or "pop-ups" showing the set and the verification code. The set of representative characters may be displayed as an "N-pad" which is a table having N columns and M rows. However, other manners of display may be used for the set of representative characters without departing from this invention. Furthermore, the display must show the representation code associated with each representative character. This allows a user to select a proper representative character when input the string containing the interspersed password and verification code.

In step 730, the client device receives an input of representative characters that encode a string of characters of the verification code and password interspersed in the proper order for each of the password and verification code. In optional step 735, the input string may be encrypted. The input string is then transmitted to the server of the provider system in step 740. The client device then receives an answer to the authentication in step 745 and process 700 ends.

Figure 9:
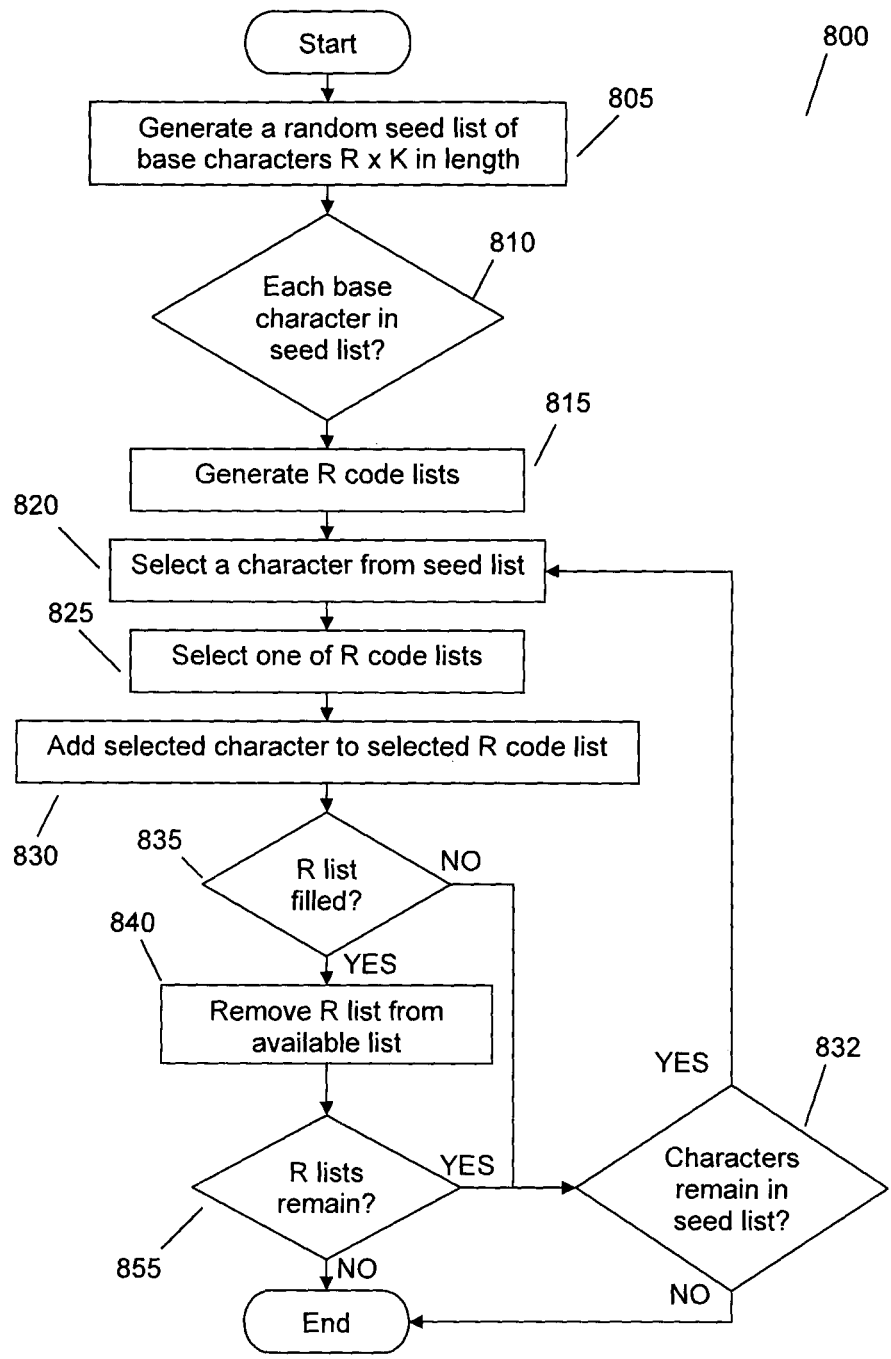
FIG. 9 illustrating a flow diagram of a process for generating representative characters in embodiments in accordance with this invention.

FIG. 9 illustrates a flow diagram of process 800 that is an embodiment of a process for generating a set of representative characters in response to a log-in request in accordance with this invention. One skilled in the art will recognize that in order to increase security, new representation codes are generated for each of the representative character each time a request is received. Process 800 begins in step 805 by generating a seed list of base characters that are R*K in length where R is the number of representative characters and K is the number of base characters represented by a representative character. Preferably, a random base character is selected for each position in the seed list. The exact manner in which the base characters are randomly selected is conventional and is omitted for brevity.

In step 810, process 800 determines whether the generated seed list includes at least one occurrence of each of the possible base characters. In some embodiments, the occurrence of each possible base member is satisfied by populating the list with one occurrence of each base character and then filing the remainder of the list with randomly selected base characters. If the seed list does not include at least one occurrence of each base character, process 800 repeats step 805 to produce a new seed list.

If the seed list does include at least one occurrence of each base character, process begins generating the representation codes of each of the R representative characters. In step 815, a data structure for each of the R representative characters and their associated representation codes is generated. Preferably, the representative codes are stored as linked lists or other data structures that may be easily traversed during use by an application.

In step 820, a base character is selected from the seed list. Preferably, the base character is selected from anywhere in the seed list to increase security. However, other method such as selecting the first or last character in the seed list may be used without departing from this invention. In step 825, the representative code list of one of the available R representative characters is selected. The selected base character is then inserted in the selected representative code list. One skilled in the art will recognize that this may include a check to make sure the same base character is not present in the list and performing a recovery if the character is already present in the list.

After the base character is inserted into the representation code list, the list is checked to determine if the list is complete. If the representation code list is complete, the representative character associated with the code is removed from the available representative characters in step 840. Process 800 then determines whether there are any remaining available representative characters in step 855. If not, process 800 ends. If representative characters are available, process 800 repeats from step 820. Optionally, the seed list may be checked to determine if characters remain in the list in step 833 after step 855. If not, process 800 ends. Otherwise, process 800 repeats from step 820.

Figure 10:
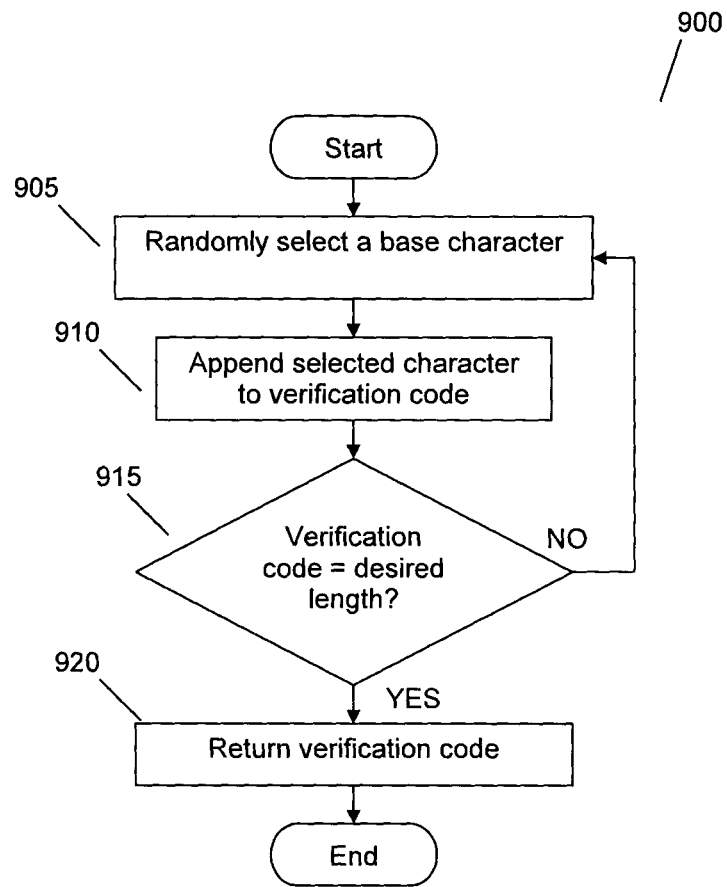
FIG. 10 illustrating a flow diagram of a process for generating a verification code in embodiments in accordance with this invention.

FIG. 10 illustrates a flow diagram of process 900 that is an embodiment of a process performed by the server to generate a verification code in accordance with this invention. Process 900 begins in step 905 by randomly selecting a base character from the base characters that may be used to generate a password. One skilled in the art will recognize any number of methods for randomly selecting a random base character may be used and the exact method is left as a design choice to those skilled in the art. In step 910, the selected base character is added to the verification code. In some embodiments the selected character may be appended to either the beginning or the end of the verification code. This is desirable if the verification is stored in a linked list or other dynamic data structure. However, the selected character may also be added to any position of the code without departing from this invention.

Process 900 then determines whether the verification code is complete in step 915. One manner this may be determined is whether the code has reached a predetermined length. However, other methods may be used without departing with this invention. If the code is not complete, process 900 is repeated from step 905. Otherwise, the verification code is returned in step 940 and process 900 ends.

Figure 11:
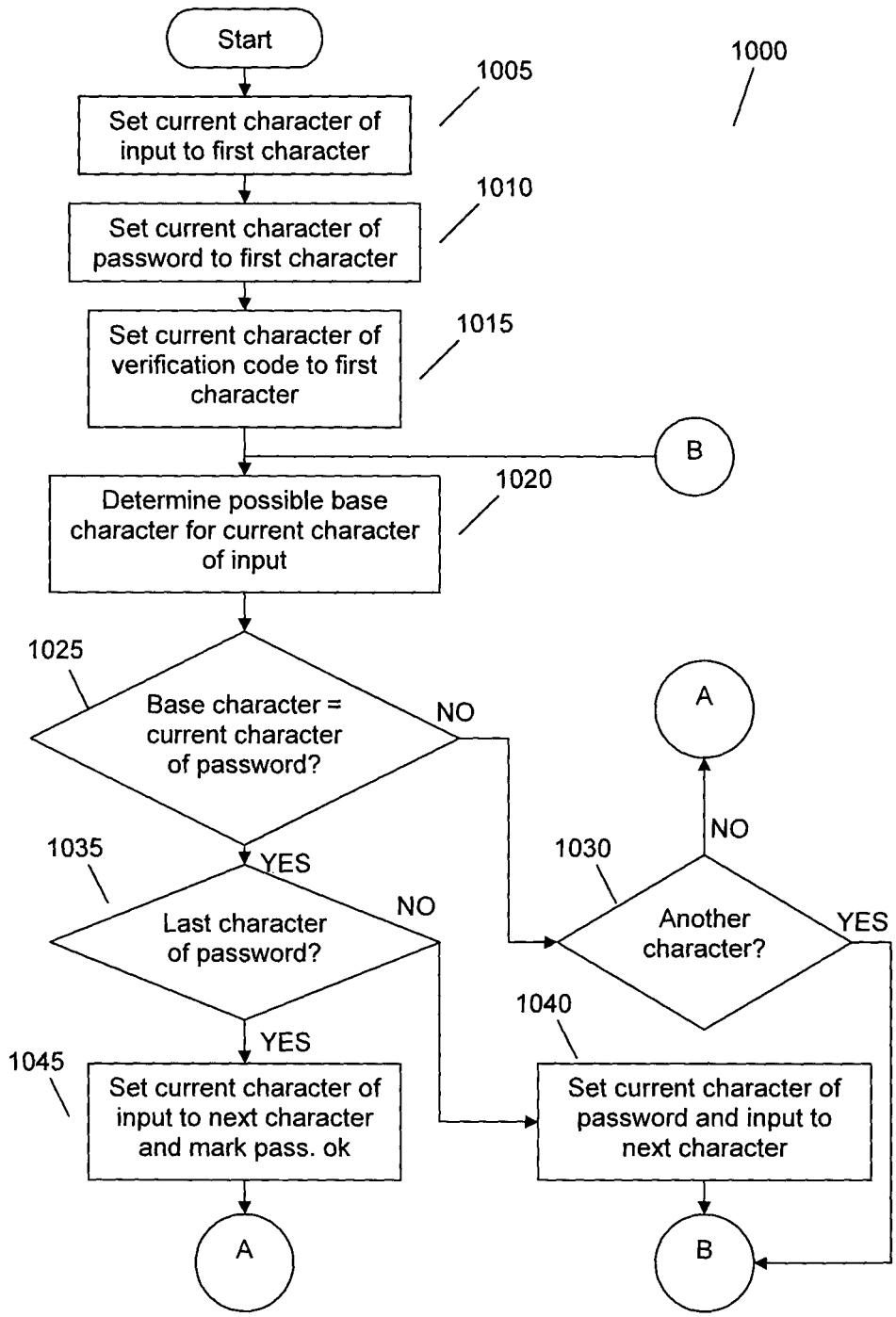
FIGS. 11 and 12 illustrating a flow diagram of a process for comparing an input to a password and verification code in embodiments in accordance with this invention.
Figure 12:
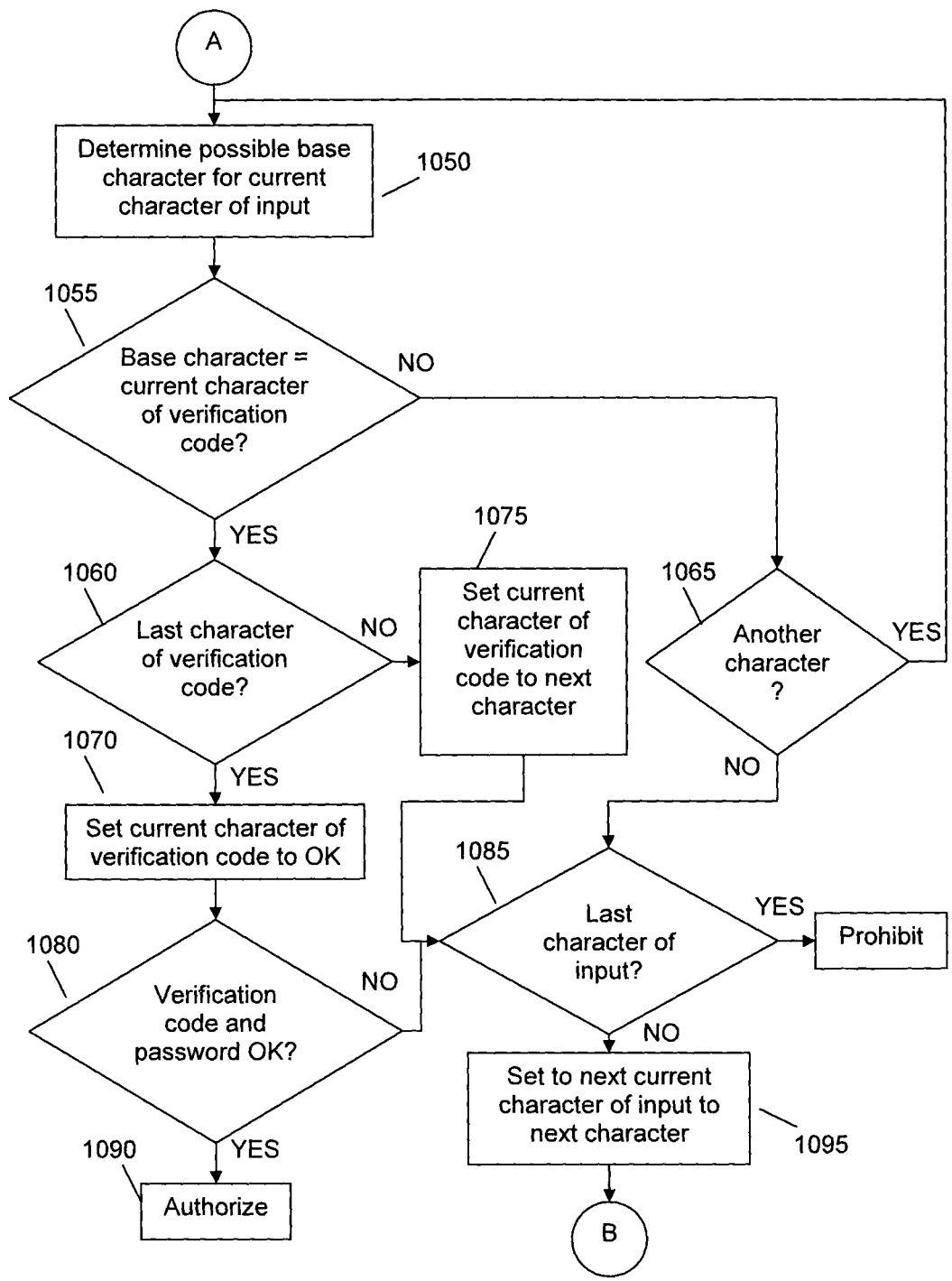

FIGS. 11 and 12 illustrate a flow diagram of process 1000 that is an embodiment of an authentication process for determining whether the input string of representative characters matches the password and verification code. One skilled in the art will note that the process operates even if random characters are added to the input string. Furthermore, one skilled in the art will recognize that password, verification code, and input should be stored in a data structure that allows them to be traversed. Examples include a linked, array, or other similar data structure.

Process 1000 begins in step 1005 by setting a current character of input string to the first character of the input string. The current character of the password is set to the first character of the password in step 1010 and the current character of the verification code is set to the first character of the verification code in step 1015. Process 1000 then begins the comparison.

The comparison of the input to the password begins in step 1020 by selecting a base character from the representation code list of the current representative character of the input string. In step 1025, the selected base character is compared to the current character of the password. If the characters do not match, process 1000 determines whether the representation list contains more base characters. If so, process 1000 repeats from step 1020. If not, process 1000 proceeds to step 1050.

If the selected character matches the current character of the password in step 1025, process 1000 determines whether the current character of the password is the last character of the password. If not, the current character of the password and input are each set to the next characters of each and process 1000 repeats from step 1020. If the current character of the password is the last character, the password is marked match, the current character is moved to the next character and process 1000 proceeds to step 1050.

The comparison of the input to the verification code begins in step 1050 by selecting a base character from the representation code list of the current representative character of the input string. In step 1055, the selected base character is compared to the current character of the verification. If the characters do not match, process 1000 determines whether the representation list contains more base characters in step 1065. If so, process 1000 repeats from step 1050. If not, process 1000 determines whether the current position of the input is the last character of the input in step 1085. If not, the current position of the input is moved to the next character in step and process 1000 is repeated from step 1020. If the current position is the last position of the input, a mismatch is indicated and process 1000 ends.

If the selected character matches the current character of the password in step 1055, process 1000 determines whether the current character of the verification is the last character of the verification code. If not, the current character of the verification code is set to the next character of the verification code. Process 1000 determines whether the current position of the input is the last character of the input in step 1085. If not, the current position of the input is moved to the next character in step 1095 and process 1000 is repeated from step 1020. If the current position is the last position of the input, a mismatch is indicated and process 1000 ends.

If the current character of the verification code is the last character, the verification code is marked matched. Process 1000 then determines if both the password and verification code are matched in step 1080. If so, process 1000 returns a match. Otherwise process 1000 proceeds to step 1085 as described above.

Preferably, an embodiment of process 1000 may be performed by recursive processes. The following pseudo code provides these recursive processes:

```
boolean check_pwd_character(character ch, int position);
boolean check_auth_character(character ch, int position);
boolean check_pwd_pattern(string pattern, int position)
{
    foreach ch in pattern
        if check_pwd_character(ch, position)==true
            return true;
    return false;
}
boolean check_auth_pattern(string pattern, int position)
{
    foreach ch in pattern
        if check_pwd_character(ch, position)==true
            return true;
    return false;
}
void check_user_string(string st, int str_pointer, int pwd_position,
int auth_position)
{
    if (pwd_position >= password_length) && (auth_position >=
    authentication_length)
        is_correct = true;
    if (str_pointer >= string_length)
        return;
    string current_pattern = get_pattern(st, str_pointer);
    if check_pwd_pattern(current_pattern, pwd_position) == true
        check_user_string(st, str_pointer+1, pwd_position+1,
        auth_position);
    if is_correct == true
        return;
    if check_auth_pattern(current_pattern, pwe_position) == true
        check_user_string(st, str_pointer+1, pwd_position,
        auth_position+1);
    if is_correct == true
        return;
    check_user_string(st, str_pointer+1, pwd_position,
    auth_position);
}
```

The above is a description of embodiments of a system and process in accordance with the present invention as set forth in the following claims. It is envisioned that other will design alternatives that fall within the scope of the following claims.

What is claimed is:

1. A system for authenticating a user comprising:
a processor;
instructions for directing the processor to:
receive a password of a user stored by said system wherein said password comprises a string of P number of base characters,
generate R representative characters wherein each of said R representative characters represents a representation code of a predetermined number, K, of base characters; each of said base characters is represented by at least one of said R representative characters; and at least one of said base characters is represented by more than one R representative characters, generate a verification code comprised of a string a plurality of base characters, transmit said R representative characters, said representation code of each of said R representative characters, and said verification code to a user device, receive an input string from said user device wherein said input string is input by said user and comprises plurality of said R representative characters, determine whether said plurality of R representative characters represent said base characters of said password and said verification code in a proper order, and authorize said user in response to a determination that said plurality of R representative characters represent said base characters of said password and said verification code in said proper order; and a memory readable by said processor for storing said instructions.

2. The system of claim 1 wherein R is less than the total number of base characters.

3. The system of claim 1 wherein R is in a range between 0.25 the total number of base characters and 0.5 the total number of base characters.

4. The system of claim 1 wherein said instructions further comprise:

instructions for directing said processing unit to:
prohibit access to said user in response to a determination that said plurality of R representative characters represent said base characters of said password and said verification code in said proper order.

5. The system of claim 1 wherein said instructions comprise:

instructions for directing said processing unit to:
store said R representative characters and said representation code of each of said R representative characters responsive to generating said R representative characters.

6. The system of claim 1 wherein said instructions comprise:

instructions for directing said processing unit to:
store said verification code responsive to generating said verification code.

7. The system of claim 1 wherein said instructions to generate said R representative characters comprise:

instructions for directing said processing unit to:
generate a seed list comprised of base characters that is R *K in length wherein said seed list includes at least one occurrence of each of said base characters, and
insert each of said base characters in said seed list into said representative code list of one said R representative characters.

8. The system of claim 7 wherein said instructions to generate said seed list comprise:

instructions for directing said processing unit to:
randomly select one of said base characters for each position in said seed list,
determine that said seed list includes at least one occurrence of each of said base characters, and
generate a new seed list in response to a determination that said seed list does not include at least one occurrence of each of said base characters.

9. The system of claim 1 wherein said instructions to determine whether said plurality of R representative characters represent said base characters of said password and said verification code in a proper order comprises:

compare said base characters represented by each of said plurality R representative characters in said input in order to said base characters in each of said password and said verification code.

10. The system of claim 9 wherein said instructions to compare said base characters represented by each of said plurality R representative characters in said input in order to said base characters in each of said password and said verification code comprise:

instructions for directing said processing unit to:
a. set a current character of said input to a first character of said Input,
b. set a current character of said password to said first character of said password,
c. set a current character of said verification code to said first character of said verification code,
d. compare said current character of said password to each base character represented by said R representative character in said current position in said input,
e. determine whether said current character is said password is a last character of said password in response to a match between said current characters of said password and one of said base characters represented by said R representative character of said input,
f. determine said password is matched responsive to a determination that said current character of said password is said last character of said password,
g. set said current character of said password to a next character of said password responsive to determination that said current character of said password is not said last character of said password,
h. compare said current character of said verification code to each base character represented by said R representative character in said current position in said input in response to no match between said current characters of said password and one of said base characters represented by said R representative character of said input,
i. determine whether said current character is said verification code is a last character of said verification in response to a match between said current characters of said verification and one of said base characters represented by said R representative character of said input,
j. determine said verification code is matched responsive to a determination that said current character of said verification code is said last character of said password,
k. set said current character of said verification code to a next character of said verification code responsive to determination that said current character of said verification code is not said last character of said verification,
l. determine whether said password and said verification code are matched
m. return a positive match in response to a determination said password and verification code are matched,
n. determine whether said current character of said input is said last character of said input,
o. return a negative match in response to a determination is said current character of said input is said last character of said input,
p. set said current character of said Input to said last is next character of said input in response to a determination that said current character of said input is not said last character,
q. repeat steps d-q.

11. The system of claim 1 wherein said R representative characters are of a type selected from a group consisting of the numerals 0-9, alphanumeric characters, and ANSI characters.

12. The system of claim 1 wherein said R representative characters and said representation code of each of said R representative characters; and said verification code are transmitted by different means of transmission.

13. The system of claim 12 wherein said Instructions to transmit said R representative characters, said representation code of each of said R representative characters comprise:
instructions for directing said processing unit to:
transmit a message including said verification code to said user where the message is of a message type selected from a group consisting of a SMS message and an e-mail message.

14. The system of claim 1 further comprising:
instructions for directing a processing unit of said client device to:
receive information about said R representative characters and said, representation code of each of said R representative characters,
generate a display of said R representative characters and said representation code of each of R representative characters, display said display to said user,
receive said input of a string of said R representative characters from said user, and
transmit said input to said server.

15. The system of claim 14 wherein said display includes an arrangement of said R representative characters in a table having N columns and M rows wherein M*N=R.

16. A method performed by server for authenticating a user requesting a service over a network comprising:
receiving a password of a user stored by said system wherein said password comprises a string of P number of base characters;
generating R representative characters wherein each of said R representative characters represents a representation code of a predetermined number, K, of base characters; each of said base characters is represented by at least one of said R representative characters; and at least one of said base characters is represented by more than one R representative characters;
generating, by processor, a verification code comprised of a string a plurality of base characters,
transmitting said R representative characters, said representation code of each of said R representative characters and said verification code to a user device,
receiving an input string from said user device wherein said input string is input by said user and comprises plurality of said R representative characters;
determining whether said plurality of R representative characters represent said base characters of said password and said verification code in a proper order; and
authorizing said user in response to a determination that said plurality of R representative characters represent said base characters of said password and said verification code in said proper order.

17. The method of claim 16 wherein R is less than the total number of base characters.

18. The method of claim 16 wherein R is in a range between 0.25 the total number of base characters and 0.5 the total number of base characters.

19. The method of claim 16 further comprising:
prohibiting access to said user in response to a determination that said plurality of R representative characters represent said base characters of said password and said verification code in said proper order.

20. The method of claim 16 further comprising:
storing said R representative characters and said representation code of each of said R representative characters responsive to generating said R representative characters.

21. The method of claim 16 further comprising:
storing said verification code responsive to generating said verification code.

22. The method of claim 16 wherein said step of generating said R representative characters comprise:
generating a seed list comprised of base characters that Is R *K in length wherein said seed list includes at least one occurrence of each of said base characters; and
inserting each of said base characters in said seed list Into said representative code list of one said R representative characters.

23. The method of claim 22 wherein said step of generating said seed list comprises:
randomly selecting one of said base characters for each position in said seed list; determining that said seed list includes at least one occurrence of each of said base characters; and
generating a new seed list in response to a determination that said seed list does not include at least one occurrence of each of said base characters.

24. The method of claim 16 wherein said step of determining whether said plurality of R representative characters represent said base characters of said password and said verification code in a proper order comprises:
comparing said base characters represented by each of said plurality R representative characters in said input in order to said base characters in each of said password and said verification code.

25. The method of claim 24 wherein said step of comparing said base characters represented by each of said plurality R representative characters in said Input in order to said base characters in each of said password and said verification code comprises:
a. setting a current character of said input to a first character of said input;
b. setting a current character of said password to said first character of said password;
c. setting a current character of said verification code to said first character of said verification code;
d. comparing said current character of said password to each base character represented by said R representative character in said current position in said input;
e. determining whether said current character is said password is a last character of said password in response to a match between said current characters of said password and one of said base characters represented by said R representative character of said input;
f. determining said password is matched responsive to a determination that said current character of said password is said last character of said password;
g. setting said current character of said password to a next character of said password responsive to determination that said current character of said password is not said last character of said password;
h. comparing said current character of said verification code to each base character represented by said R representative character in said current position in said input in response to a mismatch between said current characters of said password and one of said base characters represented by said R representative character of said input;
i. determining whether said current character is said verification code is a last character of said verification in response to a match between said current characters of said verification and one of said base characters represented by said R representative character of said input, j. determining said verification code is matched responsive to a determination that said current character of said verification code is said last character of said password;

k. setting said current character of said verification code to a next character of said verification code responsive to determination that said current character of said verification code is not said last character of said verification, l. determining whether said password and said verification code are matched;

m. returning a positive match in response to a determination said password and verification code are matched;

n. determining whether said current character of said input is said last character of said Input;

o. returning a negative match in response to a determination is said current character of said input is said last character of said input, p. set said current character of said input to said last is next character of said input in response to a determination that said current character of said input is not said last character, q. repeat steps d-p.

26. The method of claim 16 wherein said R representative characters are of a type selected from a group consisting the numerals 0-9, the alphanumeric characters, and ANSI characters.

27. The method of claim 16 wherein said step of transmitting said R representative characters, each representation code of each of said R representative characters, and said verification code comprises:

transmitting said R representative characters, each representation code of each of said R representative characters, and said verification code via different means of transmission.

28. The method of claim 27 wherein said step of transmitting said R representative characters, each representation code of each of said R representative characters, and said verification code comprises:

transmitting a SMS message including said verification code to a said user wherein said message is a type selected from a SMS message and an e-mail message.

29. The method of claim 16 further comprising:

receiving information about said R representative characters and said, representation code of each of said R representative characters;

generating a display of said R representative characters and said representation code of each or R representative characters;

displaying said display on said user device;

receiving said input of a string of said R representative characters from said user; and transmitting said input to said server.

30. The method of claim 29 wherein said display includes an arrangement of said R representative characters in an table having N columns and M rows wherein M*N=R.

* * * * *